US008510512B2

(12) United States Patent
Ganfield et al.

(10) Patent No.: US 8,510,512 B2
(45) Date of Patent: Aug. 13, 2013

(54) MEMORY COHERENCE DIRECTORY SUPPORTING REMOTELY SOURCED REQUESTS OF NODAL SCOPE

(75) Inventors: Paul A. Ganfield, Rochester, MN (US); Guy L. Guthrie, Austin, TX (US); David J. Krolak, Rochester, MN (US); Michael S. Siegel, Raleigh, NC (US); William J. Starke, Round Rock, TX (US); Jeffrey A. Stuecheli, Austin, TX (US); Derek E. Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 848 days.

(21) Appl. No.: 12/545,246

(22) Filed: Aug. 21, 2009

(65) Prior Publication Data

US 2011/0047352 A1 Feb. 24, 2011

(51) Int. Cl.
*G06F 13/00* (2006.01)
*G06F 13/28* (2006.01)

(52) U.S. Cl.
USPC .................... 711/146; 711/152; 711/E12.023

(58) Field of Classification Search
None
See application file for complete search history.

(56) References Cited

U.S. PATENT DOCUMENTS

| 7,474,658 | B2 | 1/2009 | Goodman et al. |
| 7,484,043 | B2* | 1/2009 | Heller et al. ................. 711/141 |
| 8,102,855 | B2 | 1/2012 | Goodman |
| 2003/0217115 | A1* | 11/2003 | Rowlands ..................... 709/214 |

OTHER PUBLICATIONS

U.S. Appl. No. 11/828,439, filed Jul. 26, 2007; Primary inventor: Gary Carpenter.
U.S. Appl. No. 11/828,448, filed Jul. 26, 2007; Primary inventor: Gary Carpenter.

* cited by examiner

*Primary Examiner* — Reginald Bragdon
*Assistant Examiner* — Eric S Cardwell
(74) *Attorney, Agent, or Firm* — Yudell Isidore Ng Russell PLLC

(57) ABSTRACT

A data processing system includes at least a first through third processing nodes coupled by an interconnect fabric. The first processing node includes a master, a plurality of snoopers capable of participating in interconnect operations, and a node interface that receives a request of the master and transmits the request of the master to the second processing unit with a nodal scope of transmission limited to the second processing node. The second processing node includes a node interface having a directory. The node interface of the second processing node permits the request to proceed with the nodal scope of transmission if the directory does not indicate that a target memory block of the request is cached other than in the second processing node and prevents the request from succeeding if the directory indicates that the target memory block of the request is cached other than in the second processing node.

11 Claims, 11 Drawing Sheets

MEMORY COHERENCE DIRECTORY SUPPORTING REMOTELY SOURCED REQUESTS OF NODAL SCOPE

This invention was made with United States Government support under Agreement No. HR0011-07-9-0002 awarded by DARPA. THE GOVERNMENT HAS CERTAIN RIGHTS IN THE INVENTION.

CROSS-REFERENCE

The present application is related to U.S. Pat. No. 7,474,658, which is incorporated herein by reference in its entirety.

BACKGROUND OF THE INVENTION

1. Technical Field

The present invention relates in general to data processing systems and, in particular, to improvements in multi-node data processing systems.

2. Description of the Related Art

A conventional multiprocessor (MP) computer system, such as a server computer system, includes multiple processing units all coupled to a system interconnect, which typically comprises one or more address, data and control buses. Coupled to the system interconnect is a system memory, which represents the lowest level of volatile memory in the multiprocessor computer system and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

SUMMARY OF THE INVENTION

Memory coherency in MP computer systems generally requires visibility of operations that may affect the coherence state of a memory block to all participants throughout the MP computer system that may hold a copy of the memory block. To ensure that memory coherency messaging traffic does not consume too much bandwidth on the system interconnect, enhancements to coherency protocols have been made to reduce coherency messaging and to limit the visibility requirements of operations. For example, under certain operating scenarios, the coherency states maintained by the cache memories can be leveraged to permit a coherency-modifying operation to complete within a local processing node containing the master initiating the operation without making the operation visible to all participants in other processing nodes. Heretofore, memory-modifying operations, such as direct memory access (DMA) write operations, could not be completed without making the operations visible to all participants in the MP computer system.

In one embodiment, a data processing system includes at least a first through third processing nodes coupled by an interconnect fabric. The first processing node includes a master, a plurality of snoopers capable of participating in interconnect operations, and a node interface that receives a request of the master and transmits the request of the master to the second processing unit with a nodal scope of transmission limited to the second processing node. The second processing node includes a node interface having a directory. The node interface of the second processing node permits the request to proceed with the nodal scope of transmission if the directory does not indicate that a target memory block of the request is cached other than in the second processing node and prevents the request from succeeding if the directory indicates that the target memory block of the request is cached other than in the second processing node.

DETAILED DESCRIPTION OF ILLUSTRATIVE EMBODIMENT

Figure 1A:
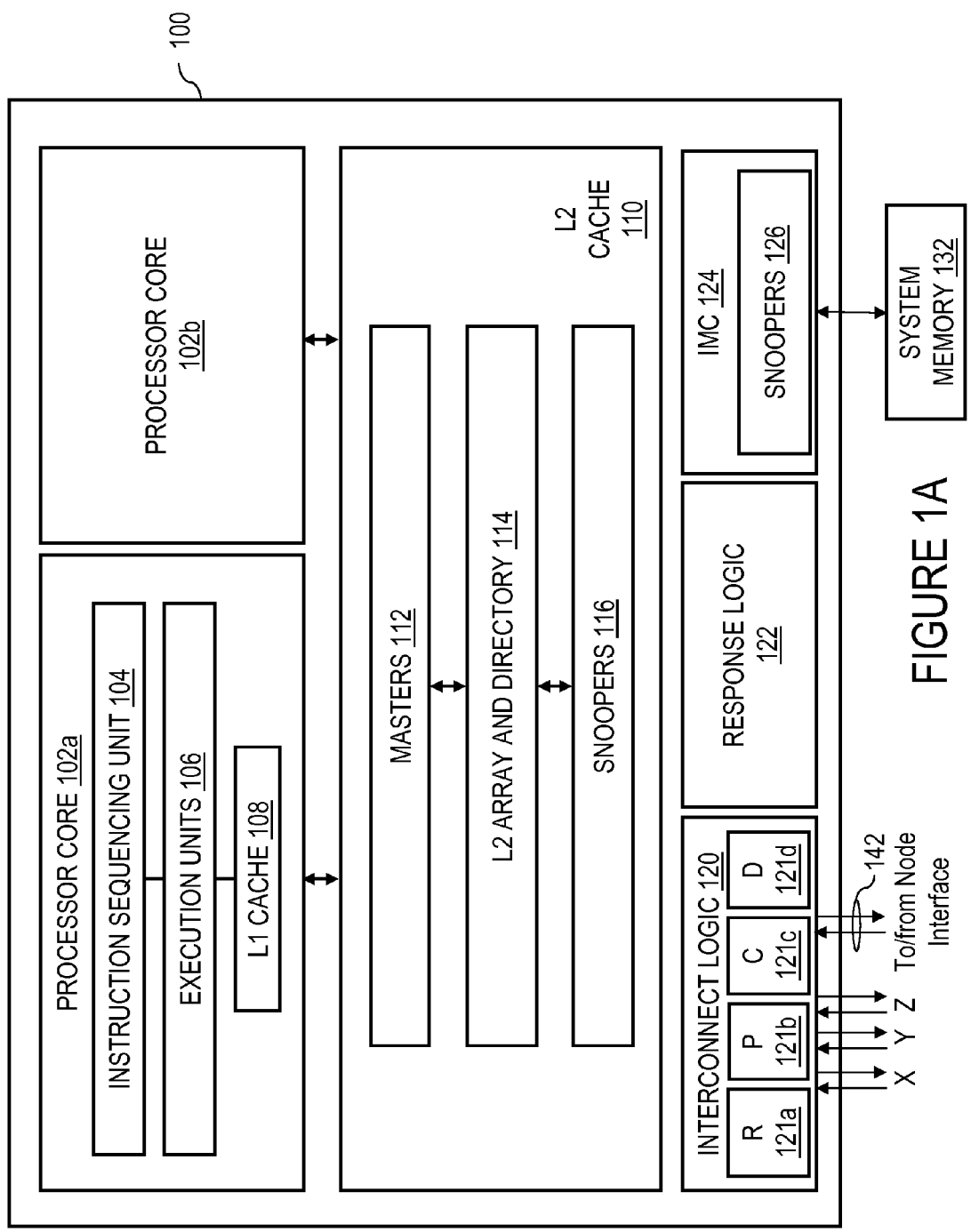
FIG. 1A is a high level block diagram of a processing unit in accordance with one embodiment.

With reference now to the figures and, in particular, with reference to FIG. 1A, there is illustrated a high level block diagram of an exemplary embodiment of a processing unit 100 in accordance with one embodiment. In the depicted embodiment, processing unit 100 is a single integrated circuit including two (or more) processor cores 102a, 102b for independently processing instructions and data. Each processor core 102 includes at least an instruction sequencing unit (ISU) 104 for fetching and ordering instructions for execution and one or more execution units 106 for executing instructions. The instructions executed by execution units 106 may include, for example, fixed and floating point arithmetic instructions, logical instructions, and instructions that request read and write access to a memory block.

The operation of each processor core 102a, 102b is supported by a multi-level volatile memory hierarchy having at its lowest level one or more shared system memories 132 (only one of which is shown in FIG. 1) and, at its upper levels, one or more levels of cache memory. As depicted, processing unit 100 includes an integrated memory controller (IMC) 124 that controls read and write access to a system memory 132 in response to requests received from processor cores 102a, 102b and operations snooped on an interconnect fabric (described below) by snoopers 126.

In the illustrative embodiment, the cache memory hierarchy of processing unit 100 includes a store-through level one (L1) cache 108 within each processor core 102a, 102b and a level two (L2) cache 110 shared by all processor cores 102a, 102b of the processing unit 100. L2 cache 110 includes an L2 array and directory 114, masters 112 and snoopers 116. Masters 112 initiate transactions on the interconnect fabric and access L2 array and directory 114 in response to memory access (and other) requests received from the associated processor cores 102a, 102b. Snoopers 116 detect operations on the interconnect fabric, provide appropriate responses, and perform any accesses to L2 array and directory 114 required by the operations. Although the illustrated cache hierarchy includes only two levels of cache, those skilled in the art will appreciate that alternative embodiments may include additional levels (L3, L4, etc.) of on-chip or off-chip in-line or lookaside cache, which may be fully inclusive, partially inclusive, or non-inclusive of the contents the upper levels of cache. In some embodiments, at least one lower level (e.g., L3) cache serves as a victim cache and is primarily populated by cache lines evicted from the next higher level (e.g., L2) cache to which it is directly connected.

Figure 1C:
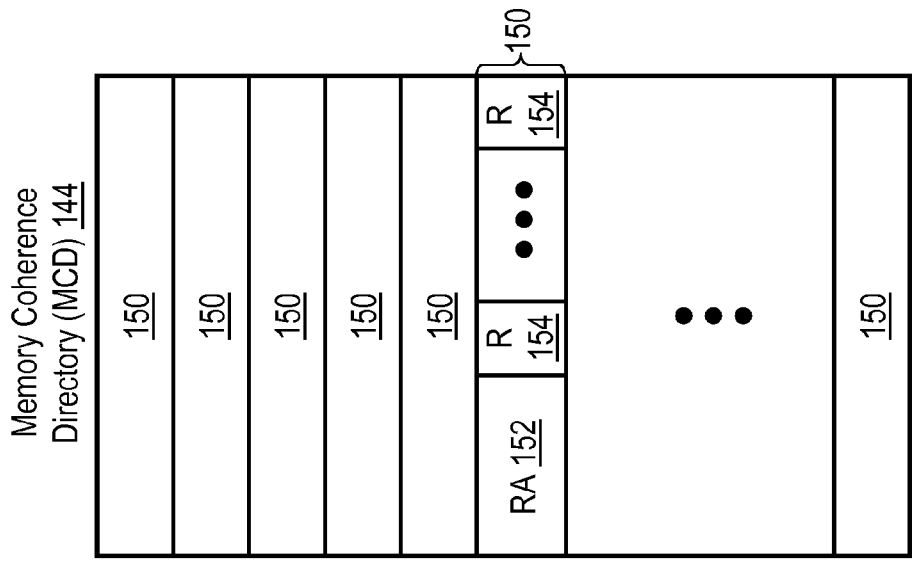
FIG. 1C is a high level block diagram of a memory coherency directory (MCD) in accordance with one embodiment.
Figure 1B:
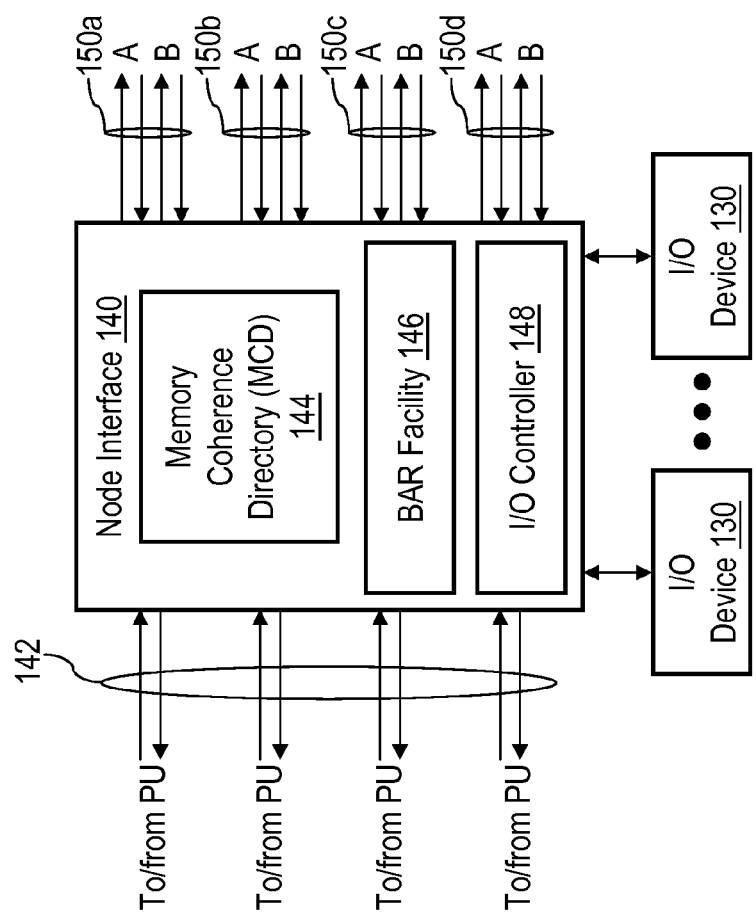
FIG. 1B is a high level block diagram of a node interface in accordance with one embodiment.
Figure 2:
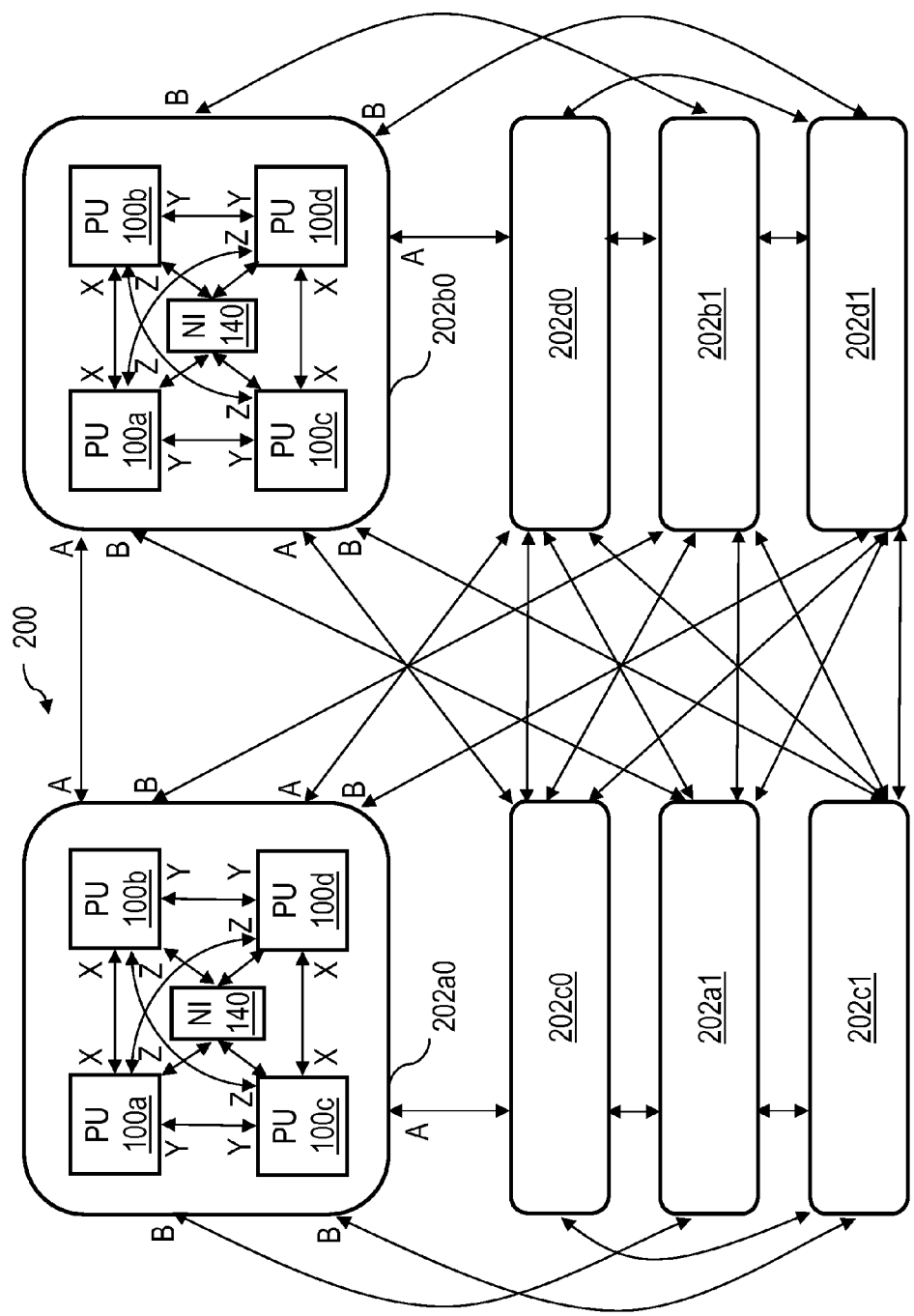
FIG. 2 is a high level block diagram of an exemplary data processing system in accordance with one embodiment.

As further shown in FIG. 1A, processing unit 100 includes integrated interconnect logic 120 by which processing unit 100 may be coupled to the interconnect fabric as part of a larger data processing system, such as data processing system 200 of FIG. 2. In the depicted embodiment, interconnect logic 120 supports an arbitrary number t1 of "first tier" interconnect links, which in this case include in-bound and out-bound X, Y and Z links to support communication with other processing units 100 in the same processing node. As also shown in FIG. 1A, interconnect logic 120 further supports local interconnect links 142 to a node interface, described further below with reference to FIG. 1B. Interconnect logic 120 includes request logic 121a, partial response logic 121b, combined response logic 121c and data logic 121d for processing and forwarding information during different phases of operations on the interconnect fabric.

Each processing unit 100 further includes an instance of response logic 122. Response logic 122 implements a portion of a distributed coherency signaling mechanism that maintains cache coherency between the cache hierarchy of processing unit 100 and those of other processing units 100. The operation of response logic 122 is described further below with reference to FIG. 3.

Referring now to FIG. 1B, there is depicted a high level block diagram of an exemplary node interface 140 in accordance with one embodiment. Node interface 140 can be realized as a single integrated circuit chip that supports the interconnection of multiple processing nodes of processing units 100 to form a larger data processing system, such as data processing system 200 of FIG. 2. In the exemplary embodiment, node interface 140 supports local interconnect links 142 for an arbitrary number (in this case, four) of processing units 100 in the local processing node it supports. In addition, node interface 140 supports an arbitrary number t2 of "second tier" interconnect links, which in this case include in-bound and out-bound A and B links 150, to permit communication between processing units 100 in the local processing node and processing units 100 in the other processing nodes. In the exemplary embodiment, each of the processing units 100a-100d in a local processing node has a respective dedicated set of A and B links 150a-150d for inter-node communication.

Node interface 140 includes an integrated I/O (input/output) controller 148 supporting the attachment of one or more I/O devices 130. I/O controller 148 may issue DMA read, DMA write, and other requests and receive data on the local interconnect links 142 and/or A and B links 150 in response to commands of I/O devices 130.

Node interface 140 receives and forwards operations between remote processing nodes and processing units 100 in its local processing node. To support enhanced targeting of operations, node interface 140 includes a base address register (BAR) facility 146 indicating the location within a data processing system (e.g., data processing system 200 of FIG. 2) of each range of memory addresses at least by processing node (and preferably by processing unit 100). Node interface 140 further includes a memory coherence directory (MCD) 144, which can be structured in any of a variety of ways.

In one embodiment illustrated in FIG. 1C, MCD 144 includes multiple entries 150 each corresponding to a respective memory region of the system memory or system memories 132 in the local processing node. For example, a memory region can correspond to an operating system-defined memory page or individually accessible memory block thereof. If desired, MCD 144 can be direct mapped and thus sized to accommodate a respective entry 150 for each memory region of the system memories 132 in the local processing node. Alternatively, MCD 144 can be configured to cache entries 150 corresponding to a small subset of the total number of memory regions of the system memories 132 in the local processing node. In such caching embodiments, each entry 150 may include a real address (RA) field 152 identifying the real address of the corresponding memory region of system memory 132 and a number of remote bits 154, each indicating whether the corresponding individually accessible memory block of the memory region identified by RA field 152 is cached other than in the local processing node.

For purposes of the description herein, it will be assumed that a remote bit 154 that is set indicates that the corresponding memory block is cached other than in the local processing node, and a reset remote bit 154 indicates that the corresponding memory block is not cached other than in the local processing node. Of course, in other embodiments, the opposite sense may be employed. In a preferred embodiment, node interface 140 manages entries 150 in MCD 144 such that remote bits 154 are set precisely and reset imprecisely. Management of MCD 144 in this manner guarantees coherency while limiting the coherency messages that node interface 140 is required to receive and to process in order to update MCD 144.

Referring now to FIG. 2, there is depicted a block diagram of an exemplary embodiment of a multiprocessor data processing system 200 formed of multiple processing units 100 in accordance with one embodiment. As shown, the exemplary embodiment of data processing system 200 includes eight processing nodes 202a0-202d0 and 202a1-202d1, which in the depicted embodiment, are each realized as a multi-chip module (MCM) comprising a package containing four processing units 100 and a node interface 140. Each processing unit 100 is coupled to each other processing unit 100 in the same processing node 202 for point-to-point communication by the processing units' first tier X, Y, and Z links, as shown. Inter-node point-to-point communication is also supported by coupling the A and B links 150 of the node interfaces 140 of various processing nodes 202. Although illustrated in FIG. 2 with a double-headed arrow, it should be understood that each pair of X, Y, Z, A and B links are preferably (but not necessarily) implemented as two unidirectional links, rather than as a single bi-directional link.

General expressions for forming the topology shown in FIG. 2 can be given as follows:
Node[I][K].chip[J].link[K] connects to Node[J][K].chip[I].link[K], for all I≠J; and
Node[I][K].chip[I].link[K] connects to Node[I][not K].chip[I].link[not K]; and Node[I][K].chip[T].link[not K] connects either to:
(1) Nothing if reserved for future expansion; or
(2) Node[extra][not K].chip[1].link[K], in case in which all links are fully utilized (i.e., nine 8-way nodes forming a 72-way system); and
where I and J belong to the set {a, b, c, d} and K belongs to the set {A,B}.

Of course, alternative expressions can be defined to form other functionally equivalent topologies. Moreover, it should be appreciated that the depicted topology is representative but not exhaustive of data processing system topologies and that other topologies are possible. In such alternative topologies, for example, the number of first tier and second tier links of each processing unit 100 can be an arbitrary number, and the number of processing nodes 202 within each tier (i.e., I) need not equal the number of processing units 100 per processing node 100 (i.e., J).

Even though fully connected in the manner shown in FIG. 2, all processing nodes 202 need not communicate each operation to all other processing nodes 202. In particular, as noted above, operations on the interconnect fabric may be broadcast with a scope limited to the local processing node 202 of the master that initiates the operation, a scope limited to a processing node 202 other than the local processing node containing the master, or with a larger scope, such as a system-wide scope including all processing nodes 202.

Those skilled in the art will appreciate that data processing system 100 can include many additional unillustrated components, such as interconnect bridges, non-volatile storage, ports for connection to networks or attached devices, etc. Because such additional components are not necessary for an understanding of described embodiment, they are not illustrated in FIG. 2 or discussed further herein.

Figure 3:
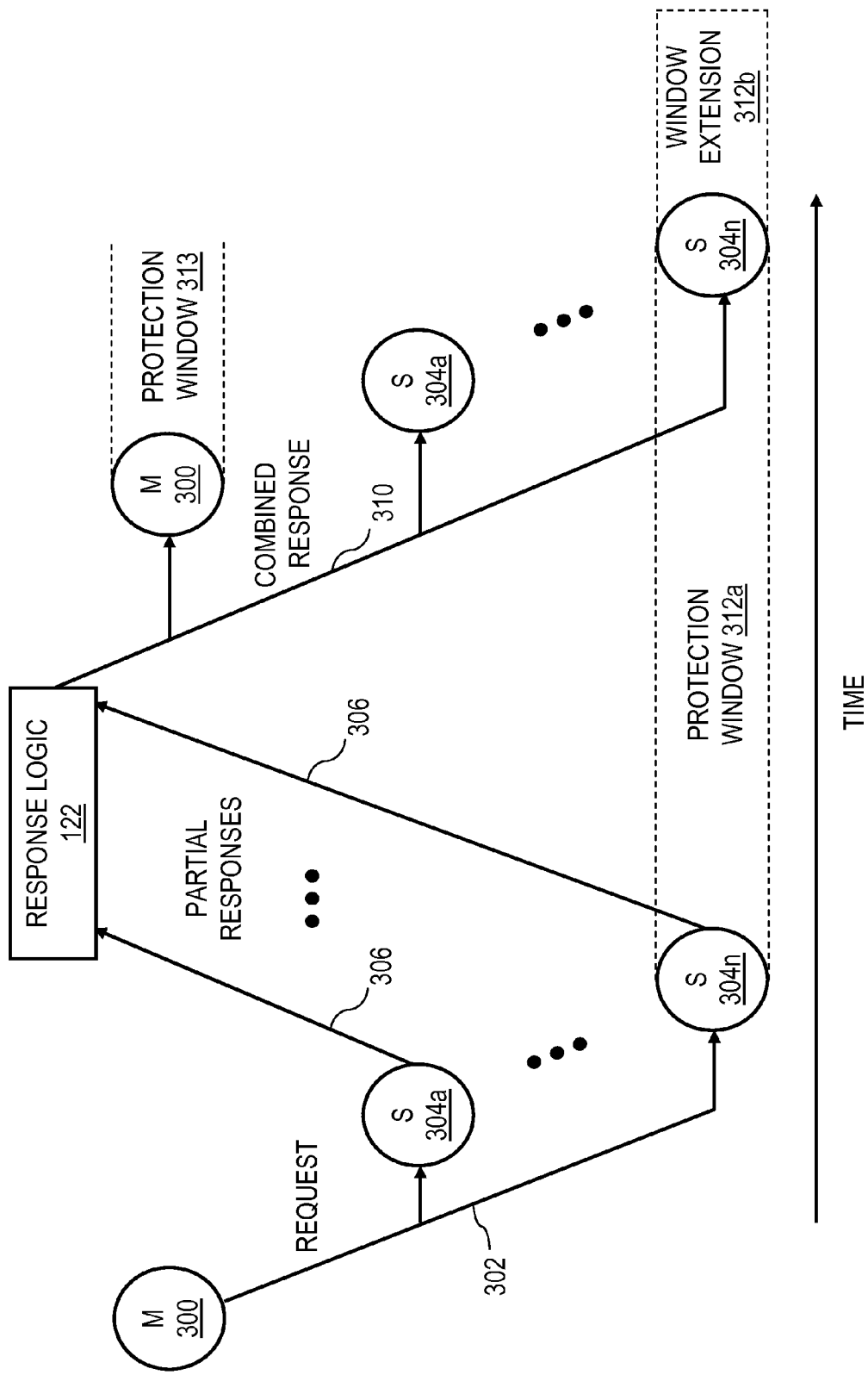
FIG. 3 is a time-space diagram of an exemplary operation including a request phase, a partial response phase and a combined response phase.

Referring now to FIG. 3, there is depicted a time-space diagram of an exemplary operation on the interconnect fabric of data processing system 200 of FIG. 2. The exemplary operation begins when a master 300 (e.g., a master 112 of an L2 cache 110 or an I/O controller 148) issues a request 302 on the interconnect fabric. Request 302 preferably includes at least a transaction type (ttype) indicating a type of desired access, a resource identifier (e.g., real address) indicating a resource to be accessed by the request, and a scope indication indicating a scope of the operation. Common types of requests preferably include those set forth below in Table I.

TABLE I

| Request | Description |
| --- | --- |
| READ | Requests a copy of the image of a memory block for query purposes |
| RWITM (Read-With-Intent-To-Modify) | Requests a unique copy of the image of a memory block with the intent to update (modify) it and requires destruction of other copies, if any |
| DCLAIM (Data Claim) | Requests authority to promote an existing query-only copy of memory block to a unique copy with the intent to update (modify) it and requires destruction of other copies, if any |
| DCBZ (Data Cache Block Zero) | Requests authority to create a new unique copy of a memory block without regard to its present state and subsequently modify its contents; requires destruction of other copies, if any |
| CASTOUT | Copies the image of a memory block from a higher level of memory to a lower level of memory in preparation for the destruction of the higher level copy |
| WRITE | Requests authority to create a new unique copy of a memory block without regard to its present state and immediately copy the image of the memory block from a higher level memory to a lower level |

TABLE I-continued

| Request | Description |
| --- | --- |
| | memory in preparation for the destruction of the higher level copy |
| PARTIAL WRITE | Requests authority to create a new unique copy of a partial memory block without regard to its present state and immediately copy the image of the partial memory block from a higher level memory to a lower level memory in preparation for the destruction of the higher level copy |

Request 302 is received by one or more snoopers 304a-304n within the scope (i.e., extent) of the operation within data processing system 200. Snoopers 304 include, for example, snoopers 116 of L2 caches 110, snoopers 126 of IMCs 124 and node interfaces 140. In general, with some exceptions, snoopers 116 in the same L2 cache 110 as the master 112 that issued a request 302 do not snoop request 302 (i.e., there is generally no self-snooping) because a request 302 is transmitted on the interconnect fabric only if the request 302 cannot be serviced internally by a processing unit 100. Snoopers 304 that receive and process requests 302 each provide a respective partial response 306 (if required by the coherency protocol) representing the response of at least that snooper 304 to request 302.

A snooper 126 within an IMC 124 determines the partial response 306 to provide based, for example, upon whether the snooper 126 is responsible for the real address specified by the resource identifier and whether the snooper 126 has resources available to service the request. Similarly, a node interface 140 determines its partial response 306 based upon whether its BAR facility 146 indicates that the resource identifier of the request specifies a real address belonging to one of the system memories 132 in its local processing node 202 and whether its MCD 144 indicates that the target memory block is cached in a remote processing node 202. A snooper 116 of an L2 cache 110 may determine its partial response 306 based on, for example, the availability of its L2 cache directory 114, the availability of a snoop logic instance within snooper 116 to handle the request, and the coherency state associated with the request address in L2 cache directory 114.

The partial responses 306 of snoopers 304a-304n are logically combined either in stages or all at once by one or more instances of response logic 122 to determine a combined response (CR) 310 to request 302. In one preferred embodiment, which will be assumed hereinafter, the instance of response logic 122 responsible for generating combined response 310 is located in the processing node 202 containing the master 300 that issued request 302. For example, if a master 112 is the source of request 302, then the instance of response logic 122 responsible for producing combined response 310 can conveniently be the one located in the same processing unit 100 as the master 112. Response logic 122 provides combined response 310 to master 300 and the participating snoopers 304 via the interconnect fabric to indicate the system-wide response (e.g., success, failure, retry, etc.) to request 302. If combined response 310 indicates success of request 302, combined response 310 may indicate, for example, a data source for a requested memory block, a cache state in which the requested memory block is to be cached by master 300, and whether "cleanup" operations invalidating the requested memory block in one or more L2 caches 110 are required.

In response to receipt of combined response 310, one or more of master 300 and snoopers 304 typically perform one or more operations in order to service request 302. These operations may include supplying data to master 300, invalidating or otherwise updating the coherency state of data cached in one or more L2 caches 110, performing castout operations, writing back data to a system memory 132, etc. If required by request 302, a requested or target memory block may be transmitted to or from master 300 before or after the generation of combined response 310 by response logic 122.

In the following description, the partial response 306 of a snooper 304 to a request 302 and the operations performed by the snooper 304 in response to the request 302 and/or its combined response 310 will be described with reference to whether that snooper is a Highest Point of Coherency (HPC), a Lowest Point of Coherency (LPC), or neither with respect to the request address specified by the request. An LPC is defined herein as a memory device or I/O device that serves as the repository for a memory block. In the absence of a HPC for the memory block, the LPC holds the true image of the memory block and has authority to grant or deny requests to generate an additional cached copy of the memory block. For a typical request in the data processing system embodiment of FIG. 2, the LPC will be the memory controller 124 for the system memory 132 holding the referenced memory block. An HPC is defined herein as a uniquely identified device that caches a true image of the memory block (which may or may not be consistent with the corresponding memory block at the LPC) and has the authority to grant or deny a request to modify the memory block. Descriptively, the HPC may also provide a copy of the memory block to a requestor in response to an operation that does not modify the memory block. Thus, for a typical request in the data processing system embodiment of FIG. 2, the HPC, if any, will be an L2 cache 110. Although other indicators may be utilized to designate an HPC for a memory block, a preferred embodiment designates the HPC, if any, for a memory block utilizing selected cache coherency state(s) within the L2 cache directory 14 of an L2 cache 110.

Still referring to FIG. 3, the HPC, if any, for a memory block referenced in a request 302, or in the absence of an HPC, the LPC of the memory block, preferably has the responsibility of protecting the transfer of ownership of a memory block, if necessary, in response to a request 302. As shown in FIG. 3, for a read-type operation, a snooper 304n at the HPC (or in the absence of an HPC, the LPC) for the memory block specified by the request address of request 302 protects the transfer of ownership of the requested memory block to master 300 during a protection window 312a that extends from the time that snooper 304n determines its partial response 306 until snooper 304n receives combined response 310 and during a subsequent window extension 312b extending a programmable time beyond receipt by snooper 304n of combined response 310. During protection window 312a and window extension 312b, snooper 304n protects the transfer of ownership by providing partial responses 306 to other requests specifying the same request address that prevent other masters from obtaining ownership (e.g., a retry partial response) until ownership has been successfully transferred to master 300. Master 300 likewise initiates a protection window 313 to protect its ownership of the memory block requested in request 302 following receipt of combined response 310.

Because snoopers 304 all have limited resources for handling the CPU and I/O requests described above, several different levels of partial responses and corresponding combined responses are possible. For example, if a snooper 126 within a memory controller 124 that is responsible for a requested memory block has a queue available to handle a request, the snooper 126 may respond with a partial response indicating that it is able to serve as the LPC for the request. If, on the other hand, the snooper 126 has no queue available to handle the request, the snooper 126 may respond with a partial response indicating that is the LPC for the memory block, but is unable to currently service the request. Similarly, a snooper 116 in an L2 cache 110 may require an available instance of snoop logic and access to L2 cache directory 114 in order to handle a request. Absence of access to either (or both) of these resources results in a partial response (and corresponding combined response) signaling an inability to service the request due to absence of a required resource.

Figure 4:
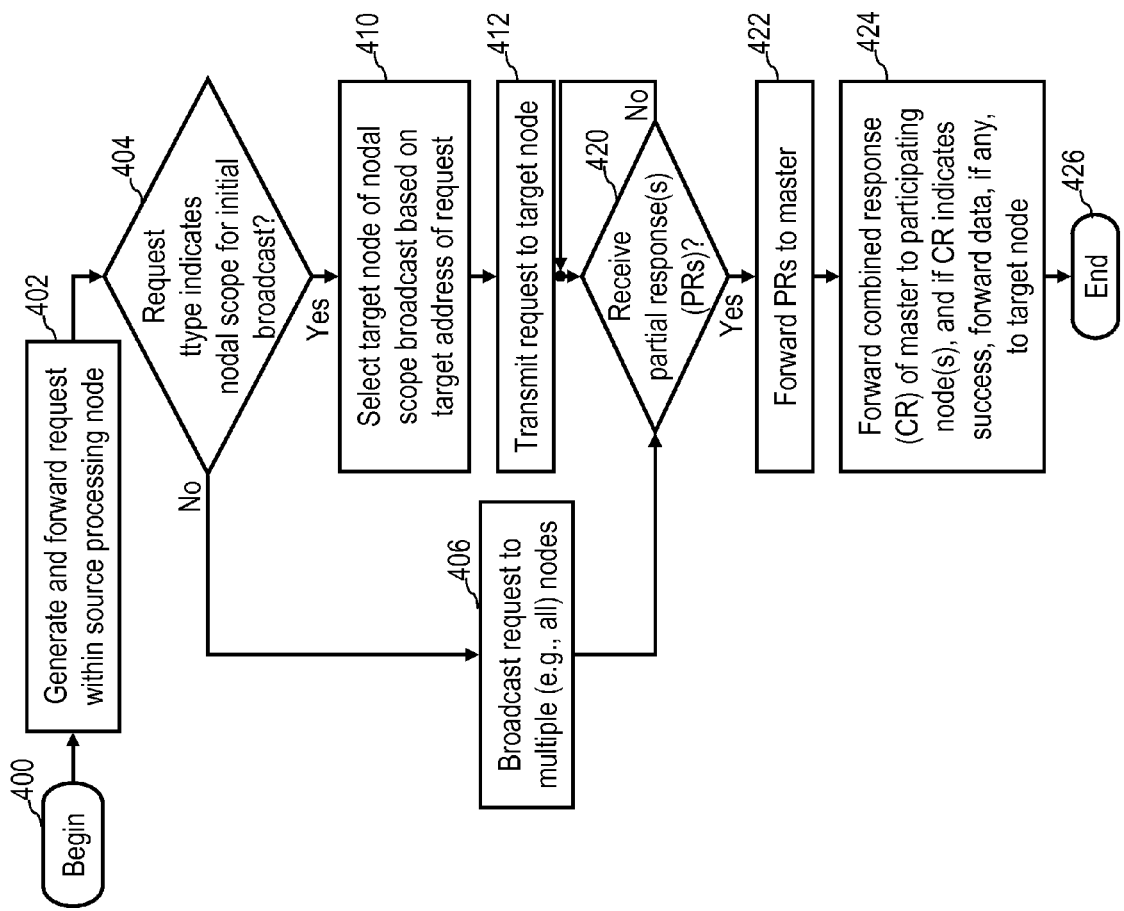
FIG. 4 is a high level logical flowchart of the operation of a node interface of a processing node containing a master initiating a request.

Referring now to FIG. 4, which will be described in conjunction with the data flow diagrams of FIGS. 6A-6D, there is illustrated a high level logical flowchart of exemplary process by which a source processing node issues a remotely sourced operation of nodal scope within data processing system 200 of FIG. 2. As in the other logical flowcharts given herein, logical rather than strictly chronological ordering of steps is illustrated. Consequently, in at least some embodiments, at least some of the illustrated operations can be performed concurrently or in a different order than that illustrated. For ease of reference, in the following description various node interfaces 140 within data processing system 200 are tagged with locational identifiers identifying the processing node 202 to which each belongs. For example, node interface 140a0 refers to the node interface of processing node 202a0, while node interface 140b0 refers to that of processing node 202b0. Processing units 100 are similarly tagged with a node identifier and are additionally tagged with an additional suffix identifying the particular processing unit 100 within the processing node 202. Thus, for example, processing unit 100a0c refers to processing unit 100c of processing node 202a0, while processing unit 100b0a refers to processing unit 100a of processing node 202b0.

The exemplary operation depicted in FIG. 4 has at least three phases as described above with reference to FIG. 3, namely, a request (or address) phase, a partial response (PR) phase, and a combined response (CR) phase. These three phases preferably occur in the foregoing order and do not overlap. The operation may additionally have a data phase, which may optionally overlap with any of the request, partial response and combined response phases.

Figure 6A:
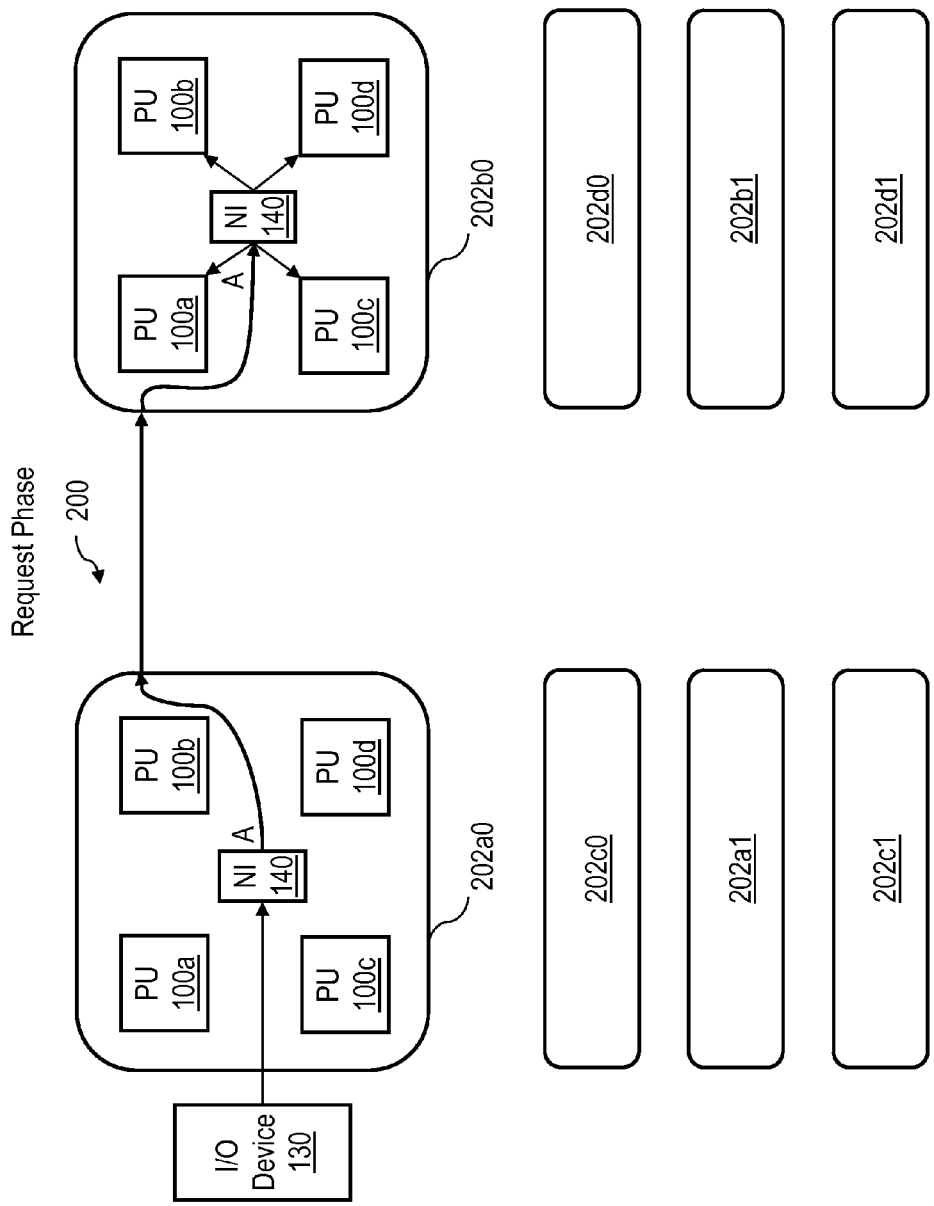
FIG. 6A is a data flow diagram illustrating the request phase of an exemplary remotely sourced operation of nodal scope within the data processing system of FIG. 2.

The process of FIG. 4 begins at block 400 and then proceeds to block 402, which illustrates a master 300 generating and forwarding a request within its processing node 202. As shown in FIG. 6A, the request phase of an exemplary DMA write operation on the interconnect fabric begins in response to receipt by I/O controller 148 of node interface 140a0 of a DMA write, command from an I/O device 130. In response to receipt of the I/O command from the I/O device 130, 110 controller 148 generates and forwards (as appropriate) a DMA write request within its local processing node 202a0. In the exemplary embodiment, because I/O controller 148 is integrated within node interface 140, I/O controller 148 simply forwards the DMA write request to request handling logic within node interface 140 without making the request visible to processing units 100a0a, 100a0b, 100a0c and 100a0d within its processing node 202a0. For non-I/O requests, such as RWITM, DCBZ, DClaim, etc., the master 300 (e.g., a master 112 of an L2 cache 110) forwards the request both to node interface 140 and to each of the processing units 100a0a, 100a0b, 100a0c and 100a0d within its (source) processing node 202.

In response to receiving the request, node interface 140a0 determines at block 404 whether the ttype of the request indicates a nodal scope for the initial broadcast of the request.

For example, DMA write requests, DCBZ requests and DClaim requests can often be resolved entirely within a home processing node 202 containing the LPC of the target address of the request without making the request visible to (i.e., without transmitting the request to) other processing nodes 202. The ability to resolve such requests within the home processing node 202 is due to the fact that DMA write requests, DCBZ requests, and DClaim requests, while all targeting memory blocks that are cacheable in all processing nodes 202 of data processing system 200, frequently target memory blocks that are cached, if at all, only within the home processing node 202. Consequently, at block 404, node interface 140*a*0 preferably selects a nodal scope for the initial broadcast of the request if the ttype of the request is a write, DCBZ or DClaim request, and selects either a nodal scope or a more expansive scope (e.g., a system-wide scope including all processing nodes 202) for other types of requests based upon the ttype and/or other factors. For a broadcast of nodal scope, node interface 140*a*0 further selects the home processing node 202 of the target address of the request as the target processing node 202 of the initial nodal scope broadcast of the request utilizing its BAR facility 146 (block 410).

Node interface 140*a*0 then transmits an initial broadcast of the request to the processing node(s) 202 within the scope selected at block 404. Thus, if a nodal scope is selected for the initial broadcast of the request, node interface 140 transmits the request via the appropriate interconnect link(s) to the home processing node 202 of the target address of the request (block 412). For example, FIG. 6A depicts node interface 140*a*0 transmitting an initial broadcast of nodal scope from processing node 202*a*0 via a second tier link A to node interface 140*b*0 of processing node 202*b*0, the home processing node 202 of the target address of the request. Of course, if the home processing node 202 of the target address of the request were processing node 202*a*0, node interface 140*a*0 would transmit the request via its local interconnects links 142 to processing units 100*a*0*a*. 100*a*0*b*, 100*a*0*c* and 100*a*0*d*. Alternatively, if greater than nodal scope is selected for the initial broadcast of the request, node interface 140 broadcasts the request to multiple processing nodes 202 (e.g., all processing nodes 202 in data processing system 200) via second tier A and/or B links 150, as depicted at block 406 of FIG. 4.

Figure 6B:
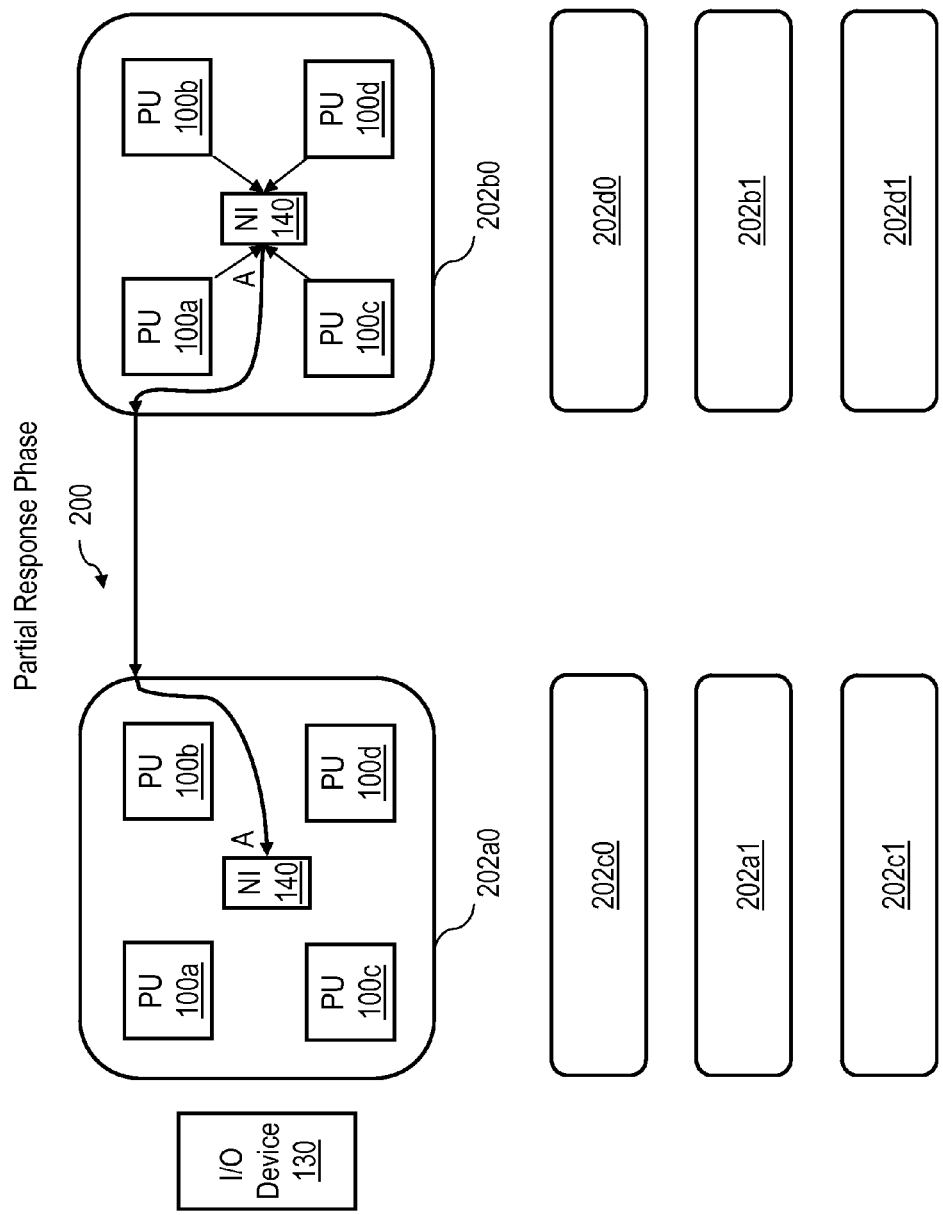
FIG. 6B is a data flow diagram depicting the partial response phase of an exemplary remotely sourced operation of nodal scope within the data processing system of FIG. 2.

Following the request phase, the partial response (PR) phase occurs, as shown at blocks 420-422 of FIG. 4 and in FIG. 6B. In the partial response phase, each participant within the scope of the broadcast of the request evaluates the request and, if required by the coherency protocol, provides its partial response to the operation to its respective node interface 140. For example, in FIG. 6A, processing units 100*b*0*a*, 100*b*0*b*. 100*b*0*c* and 100*b*0*d* transmit their respective partial responses to node interface 140*b*0 of processing node 202*b*0. Node interface 140*b*0 in turn transmits these partial responses to the node interface 140 of the processing node 202 containing the master, which in this example is node interface 140*a*0.

As will be appreciated, the collection of partial responses in the manner shown can be implemented in a number of different ways. For example, it is possible to communicate the individual partial response of each participant in an operation back to the processing node 202 containing the master of the request. Alternatively, for greater efficiency, it may be desirable to accumulate partial responses as they are communicated back to the master. In order to ensure that the effect of each partial response is accurately communicated back to the processing node 202 containing the master of the request, it is preferred that the partial responses be accumulated, if at all, in a non-destructive manner, for example, utilizing a logical OR function and an encoding in which no relevant information is lost when subjected to such a function (e.g., a "one-hot" encoding).

Figure 6C:
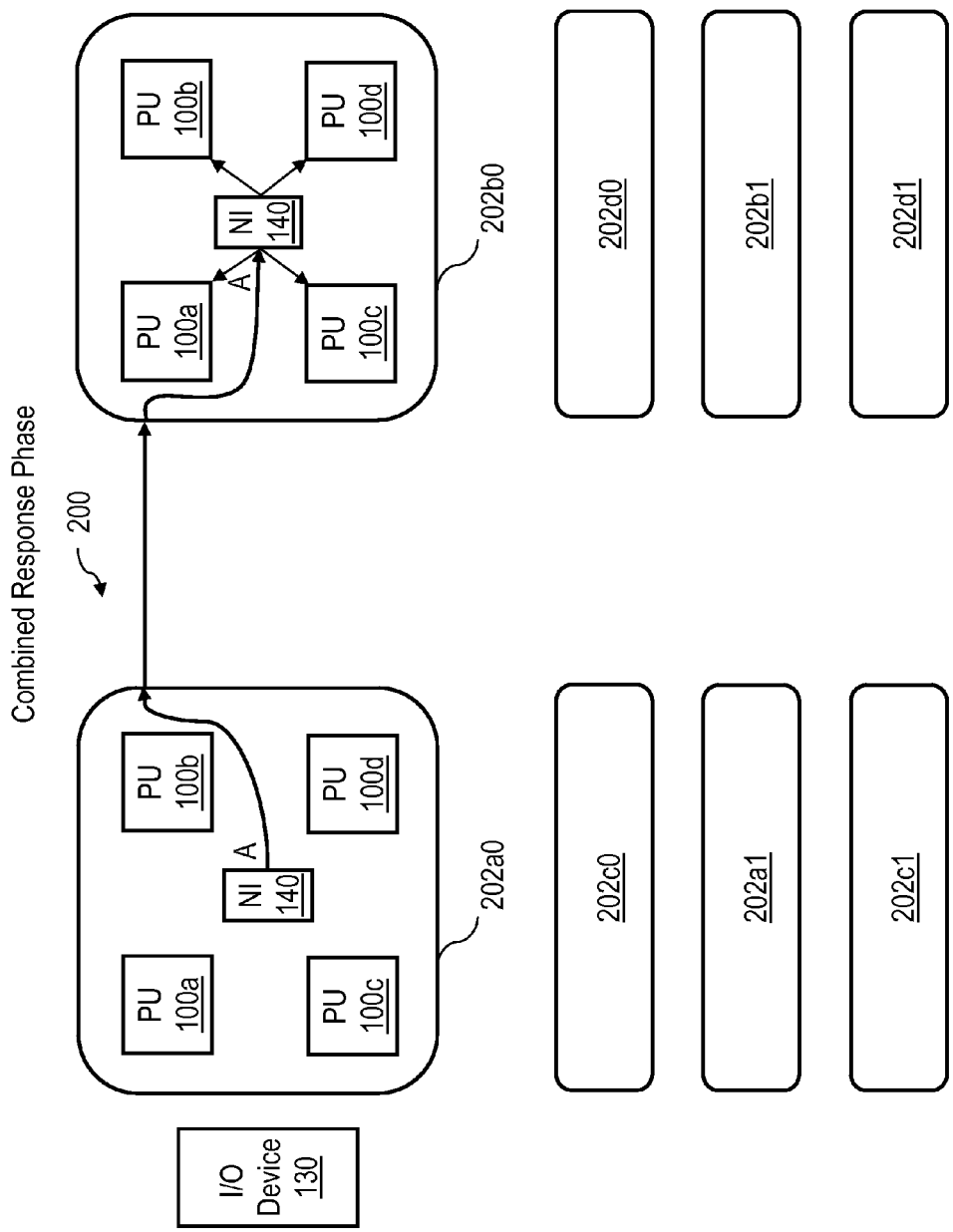
FIG. 6C is a data flow diagram illustrating the combined response phase of an exemplary remotely sourced operation of nodal scope within the data processing system of FIG. 2.

As indicated in FIG. 4, node interface 140*a*0 awaits receipt of some or all expected partial responses and, in response to receipt of the partial responses, forwards the partial responses to response logic in the processing node 202 containing the master of the request (blocks 420 and 422). The response logic within the processing node containing the master (e.g., I/O controller 148 for an I/O request or the response logic 122 of a processing unit 100 that originated a request) compiles the partial responses to obtain a combined response representing the system-wide response to the request (even in cases in which the scope is restricted to less than a system-wide scope), as depicted at block 424. The response logic then broadcasts the combined response to all participants in the operation following the same paths of distribution as employed for the request phase. Thus, as shown in FIG. 6C, the combined response is broadcast by 110 controller 148 to node interface 140*a*0, which transmits the combined response to node interface 140*b*0, which in turn transmits the combined response to each of processing units 100*b*0*a*, 100*b*0*b*, 100*b*0*c* and 100*b*0*d*.

Figure 6D:
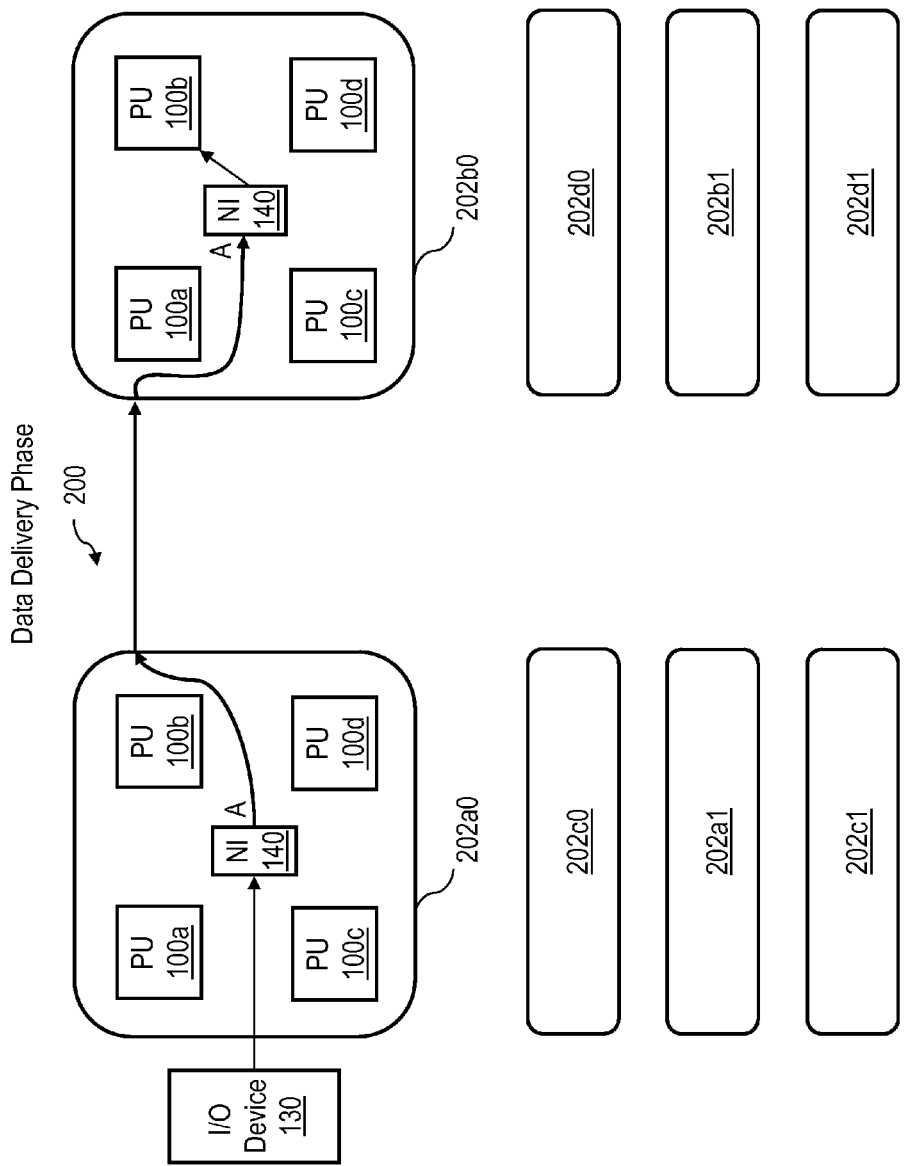
FIG. 6D is a data flow diagram depicting the data delivery phase of an exemplary remotely sourced operation of nodal scope within the data processing system of FIG. 2.

As further indicated in block 424 of FIG. 4, servicing the operation may require an additional data phase, such as shown in FIG. 6D. In the exemplary, DMA write operation given in FIG. 6D, the new value of the target memory block is transmitted via the links connecting I/O device 130 to node interface 140*a*0, node interface 140*a*0 to node interface 140*b*0, and node interface 140*b*0 to processing unit 100*b*0*b*. Conversely, if the operation is a read-type operation, such as a read or RWITM operation, a processing unit 100 in a remote processing node 202 may source the requested memory block to a local master 100 in processing unit 100*a*0 via a second tier A or B link 150 and local interconnect links 142.

Figure 5A:
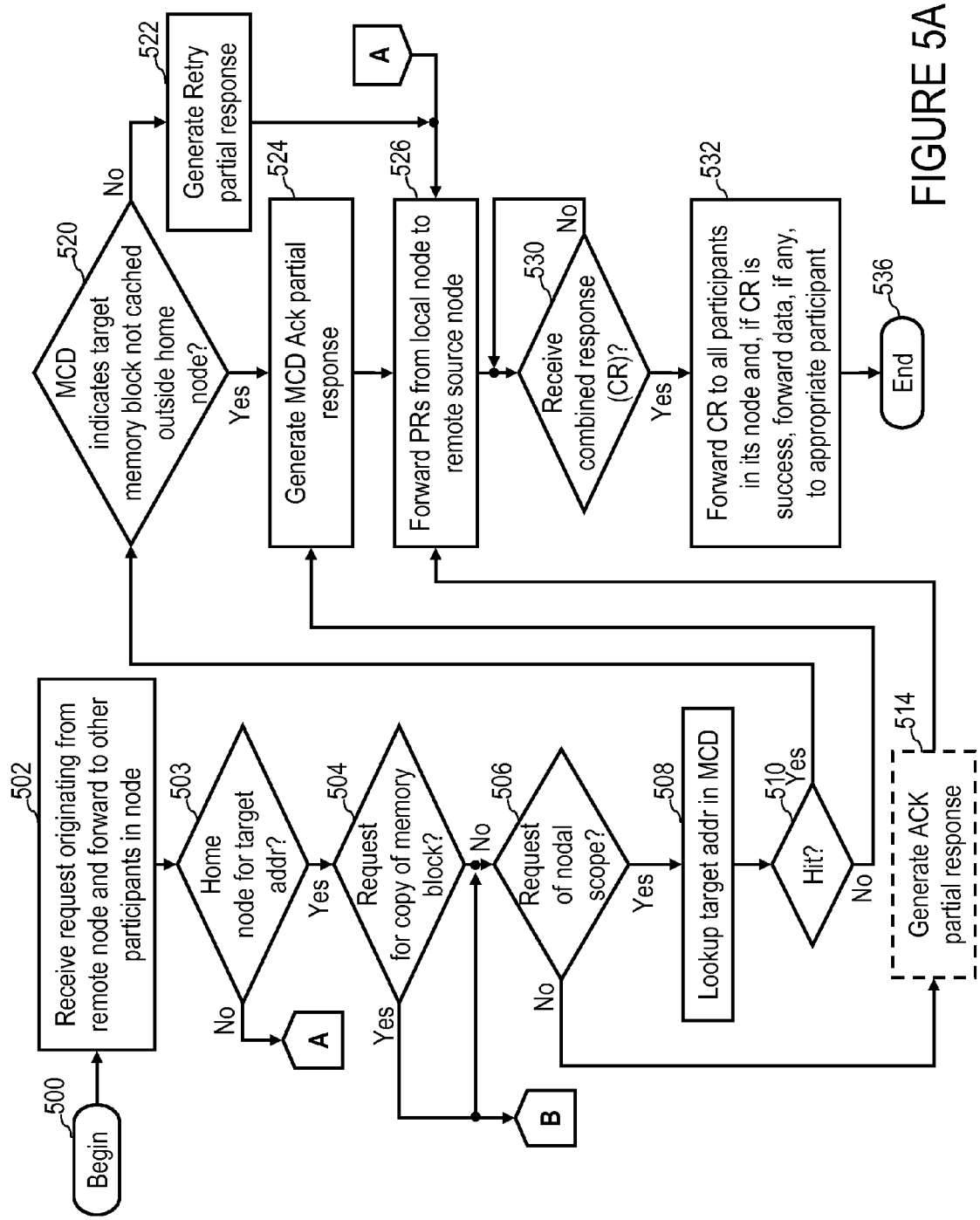
FIGS. 5A-5B together form a high level logical flowchart of the operation of a node interface of a processing node receiving a request sourced by a remote processing node.
Figure 5B:
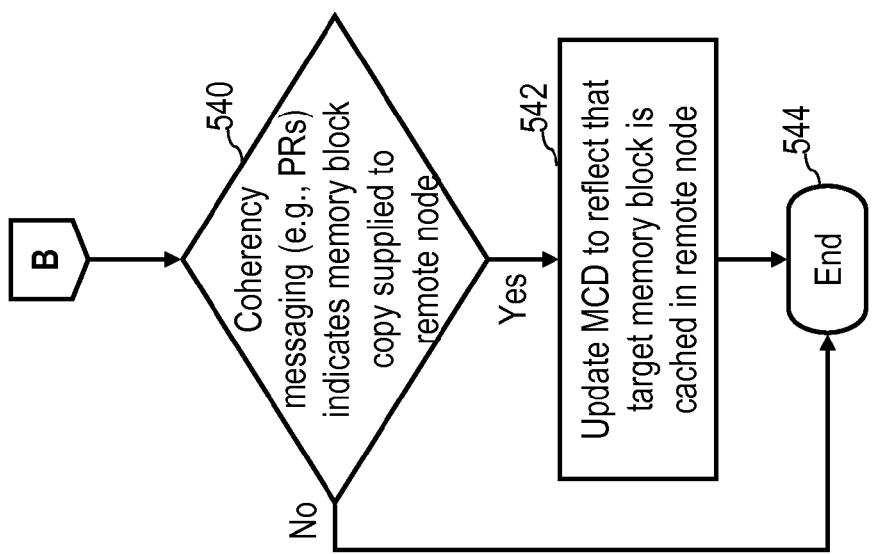

Referring now to FIG. 5A-5B, which will be described in conjunction with the data flow diagrams of FIGS. 6A-6D, there is depicted a high level logical flowchart of an exemplary process by which a node interface 140 handles a remotely sourced operation within exemplary data processing system 200 of FIG. 2. The process begins at block 500 and then proceeds to block 502, which illustrates a node interface 140 receiving a request from a remote processing node 202 via one of its second tier A and B links 150. For example, as noted above, FIG. 6A depicts node interface 202*b*0 of processing node 202*b*0 receiving a remotely sourced DMA write request from node interface 140*a*0 of remote processing node 202*a*0 via one of its A links 150.

In response to receipt of the remotely sourced request, node interface 140 determines at block 503 whether or not it is located at the home processing node 202 for the target address specified by the request. In an exemplary embodiment, node interface 140 makes the home node determination illustrated at block 503 by reference to its BAR facility 146. In response to a determination at block 503 that the node interface 140 is not located at the home processing node 202 of the target address of the request, node interface 140 preferably does not generate an explicit partial response. The process therefore passes through page connector A to block 526, which is described below. If on the other hand, node interface determines at block 503 that it is located at the home processing node 202 of the target address of the request, the process proceeds to block 504. It should be noted that for a request of nodal scope, a negative determination at block 503 is indicative of an error in programming the BAR facility 146 in the source processing node 202 of the request.

Block 504 depicts node interface 140 determining by reference to the request ttype whether or not the request is a request to cache a copy of a memory block, for example, a Read or RWITM request. If not, the process proceeds directly from block 504 to block 506. If, however, node interface 140 determines at block 504 that the request is a request to cache a copy of the memory block, the process passes from block 504 through page connector B to block 540 of FIG. 5B, which is described further below. Additionally, the process proceeds from block 504 to block 506. At block 506, node interface 140 determines whether or not the request is of nodal scope. In an exemplary embodiment, node interface 140 makes the determination of the request scope by reference to the scope indication within the request. In response to a negative determination at bock 506, the process passes to block 514, which illustrates node interface 140 generating an acknowledge (ACK) partial response, if required or permitted by the coherency protocol, to indicate that node interface 140 has received the request and will permit the request to proceed without enforcing a retry. As indicated by dashed line illustration, in some coherency protocols, node interface 140 does not generate an explicit partial response or instead generates a Null partial response. Following block 514, the process proceeds to block 526, which is described below.

If node interface 140 determines at block 506 that the remotely sourced request is of nodal scope, node interface 140 performs a lookup of the target address of the request in its MCD 144 (block 508). As indicated at block 510, if the target address of the request misses in MCD 144, meaning that the target memory block identified by the target address is cached, if at all, only within the home processing node 202, the process passes to block 524, which is described below. If, on the other hand, the target address of the request hits a valid entry in MCD 144, node interface 144 also determines at block 520 whether or not the entry in MCD 144 indicates that the target memory block is cached, if at all, only within the home processing node 202. For example, in the embodiment of FIG. 1C, node interface 140 determines whether or not the remote bit 154 corresponding to the target memory block is reset. If not, node interface 140 generates a Retry partial response, which ultimately prevents the remotely sourced request of nodal scope from completing successfully and forces the master to reissue the request with a more expansive (e.g. system-wide) scope. Following block 522, the process proceeds to block 526, which is described below. Returning to block 520, in response to a determination that MCD 144 indicates that the target memory block is cached, if at all, only within the home processing node 202, node interface 140 generates an MCD Acknowledge (Ack) partial response indicating that node interface 140 will permit the remotely sourced request of nodal scope to proceed without retry (block 524). The process then passes to block 526.

At block 526, node interface 140 transmits its partial response, if any, and the partial responses of processing units 100 in its processing node 202 to the remote processing node 202 that sourced the request. As described above, an exemplary transmission of partial responses from home processing node 202b0 to source processing node 202a0 is depicted in FIG. 6B. Following the partial response phase, node interface 140 then awaits receipt of the combined response, as depicted at block 530 of FIG. 5A and in FIG. 6C. In response to receipt of the combined response, node interface 140 forwards the combined response to all participants (e.g., processing units 100 and I/O controller 148) in the operation in its processing node 202 (block 532). As noted above, FIG. 6C depicts an exemplary operating scenario in which node interface 140b0 forwards the combined response of a remotely sourced request of nodal scope to processing units 100b0a, 100b0b, 100b0c and 100b0d in home processing node 202b0 via local interconnect links 142. Depending on the ttype of the request, if the combined response indicates success, node interface 140 may also forward data to the appropriate participant in order to service the request (block 532). For example, as discussed above, FIG. 6D illustrates node interface 140b0 delivering the new value of the target memory block of a remotely sourced DMA write operation of nodal scope to processing unit 100b0b, which includes the IMC 124 that controls the system memory 132 assigned the target address. Again, node interface 140b0 is preferably capable of specifically targeting data delivery in this manner by reference to its BAR facility 146. Following block 532, the process depicted in FIG. 5A ends at block 536.

Referring now to FIG. 5B, if a request received by node interface 140 is a remotely sourced request for a cacheable copy of a memory block, node interface 140 determines at block 540 whether or not the coherency messaging for the request, for example, the partial responses and/or the combined response, indicates that a cacheable copy of the memory block is to be supplied by the home processing node 202 to a remote processing node 202. If not, the process depicted in FIG. 5B ends at block 544. If, on the other hand, node interface 140 determines at block 540 that the coherency messaging for the request indicates that a cacheable copy of the memory block is to be supplied by the home processing node 202 to a remote processing node 202, node interface 140 updates MCD 144 to reflect that the target memory block is cached in a remote processing node 202 (block 542).

As will be appreciated, the update to MCD 144 depicted at block 542 may entail selection and eviction of a victim entry in MCD 144, for example, utilizing a least recently used (LRU) or other replacement policy. In an exemplary embodiment, eviction of a victim entry from MCD 144 preferably entails flushing remotely cached copies of any memory blocks corresponding to the victim entry so that the record maintained by MCD 144 of which memory blocks are remotely cached remains precise.

As has been described, in at least one embodiment, a data processing system includes at least a first through third processing nodes coupled by an interconnect fabric. The first processing node includes a master, a plurality of snoopers capable of participating in interconnect operations, and a node interface that receives a request of the master and transmits the request of the master to the second processing unit with a nodal scope of transmission limited to the second processing node. The second processing node includes a node interface having a directory. The node interface of the second processing node permits the request to proceed with the nodal scope of transmission if the directory does not indicate that a target memory block of the request is cached other than in the second processing node and prevents the request from succeeding if the directory indicates that the target memory block of the request is cached other than in the second processing node.

While various embodiments have been particularly shown as described, it will be understood by those skilled in the art that various changes in form and detail may be made therein without departing from the spirit and scope of the invention. For example, although embodiments have been described in which each processing node includes a single node interface 140, it will be appreciated that in other embodiments more than one node interface can be implemented. As a particular non-limiting example, it should be understood that the structures and functions of a node interface 140 can be distributed and implemented within each of processing units 100. In this regard, node interface 140, whether unified or distributed, is not required to incorporate an I/O controller, which can be separately implemented, whether as a unified or distributed I/O controller. Those skilled in the art will further appreciate that although a single remotely sourced operation of nodal scope is illustrated in FIGS. 6A-6D, under typical operating conditions a multi-node data processing system, such as data processing system 200 of FIG. 2, concurrently transmits various phases of numerous interconnect operations having differing masters and differing scopes.

What is claimed is:

1. A data processing system, comprising:
    at least a first processing node, a second processing node and a third processing node coupled by an interconnect fabric;
    wherein the first processing node includes:
        a master and a plurality of snoopers capable of participating in interconnect operations; and
        a node interface that receives a request of the master and transmits the request of the master to the second processing unit with a nodal scope of transmission limited to the second processing node, such that the plurality of snoopers in the first processing node and the third processing node do not receive the request of the master; and
    wherein the second processing node includes:
        a plurality of snoopers capable of participating in interconnect operations; and
        a node interface having a directory indicating if memory blocks assigned to the second processing node are cached other than in the second processing node, wherein said node interface, responsive to the request, permits the request to proceed with the nodal scope of transmission if the directory does not indicate that a target memory block of the request is cached other than in the second processing node and prevents the request from succeeding if the directory indicates that the target memory block of the request is cached other than in the second processing node.

2. The data processing system of claim 1, wherein said request is transmitted to the second processing node without transmitting the request to the plurality of snoopers in the first processing node.

3. The data processing system of claim 1, wherein the second processing node comprises at least one system memory in which the memory blocks assigned to the second processing node reside.

4. The data processing system of claim 1, wherein said request includes a scope indication indicating the nodal scope of the request.

5. The data processing system of claim 1, wherein said node interface prevents the request from succeeding by providing to the master a partial response indicating retry.

6. The data processing system of claim 1, wherein the request is a write request that updates a value of the target memory block.

7. A node interface for a processing node of a data processing system including at least three processing nodes coupled by an interconnect fabric, wherein the node interface includes:
    at least one interconnection for a communication link with another processing node of the data processing system;
    at least one interconnection for a communication link with a processing unit in the processing node;
    an address facility indicating which memory blocks are assigned to the processing node;
    a directory indicating if memory blocks assigned to the processing node are cached other than in the processing node; and
    logic that, responsive to receipt of a remotely sourced request from said another processing node of the data processing system, said request having a scope of transmission limited to the processing node such that the request is not received by snoopers in others of the at least three processing nodes and said request indicating a target memory block qualified by the address facility as assigned to the processing node, permits the request to proceed with the nodal scope of transmission if the directory does not indicate that the target memory block of the request is cached other than in the processing node and prevents the request from succeeding if the directory indicates that the target memory block of the request is cached other than in the processing node.

8. The node interface of claim 7, wherein said request includes a scope indication indicating the nodal scope of the request.

9. The node interface of claim 7, wherein said node interface prevents the request from succeeding by providing to a master a partial response indicating retry.

10. The node interface of claim 7, wherein the request is a write request that updates a value of the target memory block.

11. A processing node for a multi-node data processing system, comprising:
    a node interface in accordance with claim 7;
    a plurality of processing units coupled to the node interface; and
    at least one system memory, coupled to the plurality of processing units, in which the memory blocks assigned to the processing node reside.

* * * * *